United States Patent Office 3,835,045
Patented Sept. 10, 1974

3,835,045
METHOD OF FLOCCULATING
Vahan A. Hussissian, 512 E. Lake Shore Drive,
Barrington, Ill. 60010
Filed Aug. 24, 1972, Ser. No. 283,272
Int. Cl. B01d *21/01;* C02b *1/20*
U.S. Cl. 210—49
7 Claims

ABSTRACT OF THE DISCLOSURE

A flocculating method and apparatus wherein wash water is delivered into a flocculating tank, either directly or from a holding tank. Flocculating chemicals are proportioned into the flocculating tank and mixed with the wash water, until the pH thereof reaches a pre-established level. At this time, the wash water is permitted to settle for a fixed period of time, to permit the flocculated ink residue to settle to the bottom of the flocculating tank. Thereafter, the clear effluent is drained off, and then the sludge is discharged by gravity onto a filter table where it is de-watered through a roll-fed web of filter paper. The web of filter paper with the de-watered sludge on it is conveyed into disposal means, such as a disposal bin.

---

This invention relates, in general, to improved methods for removing objectionable materials from water and, in particular, to an improved flocculating system for such purposes.

The method of the present invention, while having broad application in various industries, is particularly designed and adapted to remove objectionable materials, particularly the inked waste, from the wash water used to clean flexographic presses. In the past, because of the lack of suitable methods and apparatus for cleaning this wash water, the wash water was considered polluted and therefore could not be discharged into sewage systems. This wash water, therefore, generally had to be trucked to approved land fill sites for disposal.

With the method of the present invention, the wash water is delivered into a flocculating tank, either directly or from a holding tank. Flocculating chemicals are proportioned into the flocculating tank and mixed with the wash water, until the pH hereof reaches a pre-established level. At this time, the wash water is permitted to settle for a fixed period of time, to permit the flocculated ink residue to settle to the bottom of the flocculating tank. Thereafter, the clear effluent is drained off, and then the sludge is discharged by gravity onto a filter table where it is de-watered through a roll-fed web of filter paper. The web of filter paper with the de-watered sludge on it is conveyed into disposal means, such as a disposal bin. The entire cycle of operation is completely automatic in operation and is initiated when the flocculating tank is filled with a predetermined volume of wash water. The web of filter paper also is automatically advanced when the sludge on it reaches a pre-determined thickness, and the filter paper with the de-watered sludge is conveyed into the disposal bin.

The apparatus for performing the method includes, generally, two chemical mixing and storage tanks for the flocculating chemicals, a flocculating tank into which the wash water and the flocculating chemicals are delivered and, after mixing, permitted to settle, and a sludge filter. In addition, appropriate electrical apparatus for testing the pH of the wash water and for automatically initiating and controlling its cycle of operation is provided, so that the apparatus can operate virtually unattended.

In removing the ink waste from the wash water for cleaning flexographic presses, standard chemicals that are readily available are used. In particular, sulfuric acid or ferric chloride with alum are used, however, any polyelectrolyte which will react with an alum slurry to cause the ink waste to flocculate can be used. In other applications, these chemicals merely are replaced with those which will cause the objectionable material to flocculate and settle within the flocculating tank.

Accordingly, it is an object of the present invention to provide improved methods for removing objectionable materials from water.

Another object is to provide an improved flocculating system for removing objectionable materials from water.

A more particular object is to provide an improved method and flocculating system for removing objectionable materials, particularly ink waste from the wash water used to clean flexographic presses.

A still further object is to provide a method of the above type which is completely automatic in operation.

Other objects of the invention will in part be obvious and will in part appear hereinafter.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawings.

Figure 1:
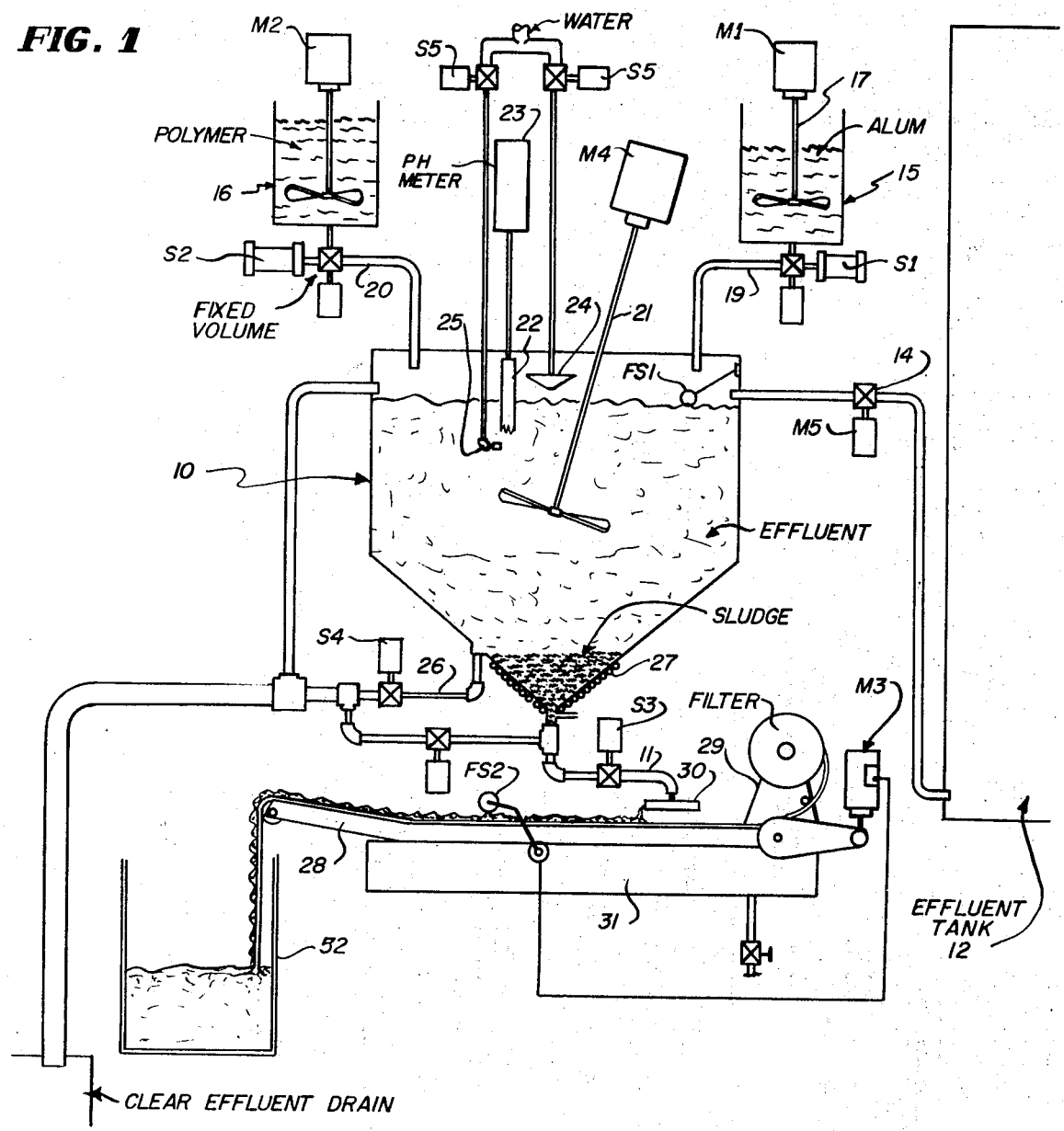
FIG. 1 is a diagrammatic type illustration of the construction of the flocculating system or apparatus of the invention.

Referring now to the drawings, particularly FIG. 1 thereof, there is generally illustrated a flocculating system exemplary of the invention including a flocculating tank 10 which is generally conical shaped at its bottom and is suitably supported in an upright position so that the material therein can be drained from the tank by gravity, through the drain pipe 11. In the illustrated and described embodiment, the water from which objectionable materials are to be removed is the wash water used to clean flexographic presses. This wash water can be pumped directly into the flocculating tank 10 or, alternatively, the wash water can be stored within a holding tank 12 and then pumped therefrom through the line 13 into the flocculating tank. A pump 14 within the line 13 is operated by a motor M5, and the latter is controlled by a float switch FS1 within the flocculating tank 10, to cut off the delivery of the wash water to the flocculating tank when the tank reaches a pre-determined volume. In this fashion, the volume of wash water within the flocculating tank 10 is controlled, and is the same for each cycle of operation. As will be apparent from the description below, it is important that the same volume of wash water be delivered to the flocculating tank for each cycle of operation, since the polymer is dispensed therein in a fixed volume.

Two chemical tanks 15 and 16 are supported above the flocculating tank, and each of these chemical tanks 15 and 16 include a flocculating chemical which in the illustrated embodiment are alum and a polyelectrolyte such as sulfuric acid or ferric chloride, respectively. These flocculating chemicals preferably are in the form of a slurry and, for this purpose, mixers 17 and 18 are provided in the respective chemical tanks 15 and 16, for mixing water and these flocculating chemicals to form a slurry. The mixers 17 and 18 are operated by means of motors M1 and M2, respectively. The flocculating chemical within the chemical tank 15 flows therefrom by gravity through the drain 19 into the flocculating tank 10, while the flocculating chemical within the chemical tank 16 flows therefrom by gravity into the flocculating tank through the drain 20. Solenoids S1 and S2 are included within the drains 19 and 20, respectively, for controlling the flow of the flocculating chemicals from the chemical tanks 15 and 16 into the flocculating tank.

A mixer 21 is disposed within the flocculating tank 10 for mixing the flocculating chemicals and the wash water therein. This mixer 21 is operated by means of a motor M4. Also disposed within the flocculating tank 10 is a probe 22 of a pH meter 23, for testing the pH of the wash water, in the manner described more fully below. Shower heads 24 and 25 are provided for washing the side walls of the flocculating tank 10 and the probe 22 of the pH meter 23, respectively, preferably after each cycle of operation.

A drain 26 is provided in the side wall of the flocculating tank 10, for draining the clear effluent from the flocculating tank after the flocculated ink waste has settled as sludge to the bottom thereof. The drain 26 includes a valve operated by a solenoid S4, for controlling the discharge of the clear effluent from the flocculating tank.

The flocculating tank 10 also preferably has heating means 27 which can be, for example, steam pipes or electrical heating coils about its discharge end or the drain pipe 11 for heating the sludge which settles therein. It has been found that heating the sludge which settles within the flocculating tank 10 prior to discharge enhances the flow of the sludge from the tank.

Disposed beneath the flocculating tank 10 is a filter bed including a conveyor 28, a roll-fed web of filter paper 29 and a receiving tray 30. The sludge from the flocculating tank flows by gravity through the drain pipe 11 onto the receiving tray 30. The sludge then flows from the receiving tray 30 onto the filter paper web 29 which is carried on the wire mesh conveyor 28. The sludge is de-watered and the filtrate is collected within a tank 31 and returned to the flocculating tank 10 or to the holding tank 12, as desired. A float switch FS2 detects the sludge build-up on the filter paper 29, and when the thickness of the sludge reaches a pre-determined thickness, a motor M3 is energized to operate the conveyor 28 to advance the web of filter paper until the sludge level drops sufficiently to turn the motor off again. The filter paper with the de-watered sludge on it is conveyed by the conveyor 28 into disposal means, such as a tote bin 52, for ultimate disposal.

As indicated above, the system or apparatus of FIG. 1 is completely automatic in operation so that it can operate virtually unattended. A clearer understanding of this operation can be appreciated by reference to FIG. 2, which is a sequence diagram of the operation of the apparatus and to FIG. 3, which is an electrical schematic of its control apparatus. In FIG. 3, when the off-on switch 35 is operated to close its contacts, power is coupled through the transformer 36 to the apparatus. A warning light 37 is energized at this time to indicate that the apparatus has been energized. Simultaneously, line switch 38 is operated to close its contacts to thereby energize motor M5 which operates the pump 14, to pump water from the holding tank 12 through the line 13 into the flocculating tank.

The solenoid S1 also is energized through the normally closed cam switch #2 and the normally closed contact 40 of the pH controller 41, thus permitting the alum slurry to flow from the chemical tank 15 through the drain 19 into the flocculating tank 10.

When the wash water within the flocculating tank 10 reaches a pre-determined volume, the float switch FS1 is operated to close its contact to thereby energize cam motor 42, as well as the warning light 43 which indicates that the cam motor 42 has been energized, a relay CR and the pH controller 41. When the relay CR is energized, it closes its normally opened contact CR1 to provide a holding circuit for the cam motor 42, the pH controller 41 and also the relay CR itself. The normally closed contact CR2 of the relay CR is opened, to thereby de-energize the motor M5 to cut off the pump 14 which pumps the wash water from the holding tank 12 into the flocculating tank 10.

Figure 2:
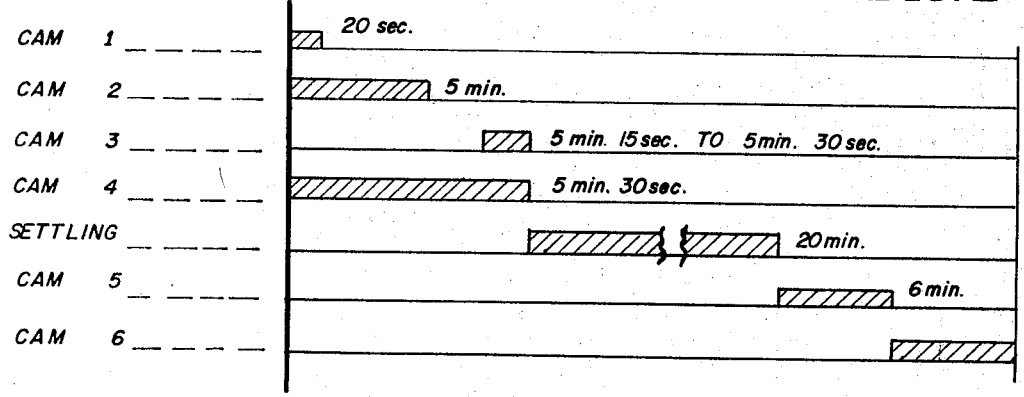
FIG. 2 is a sequence chart generally illustrating the timing cycles.
Figure 3:
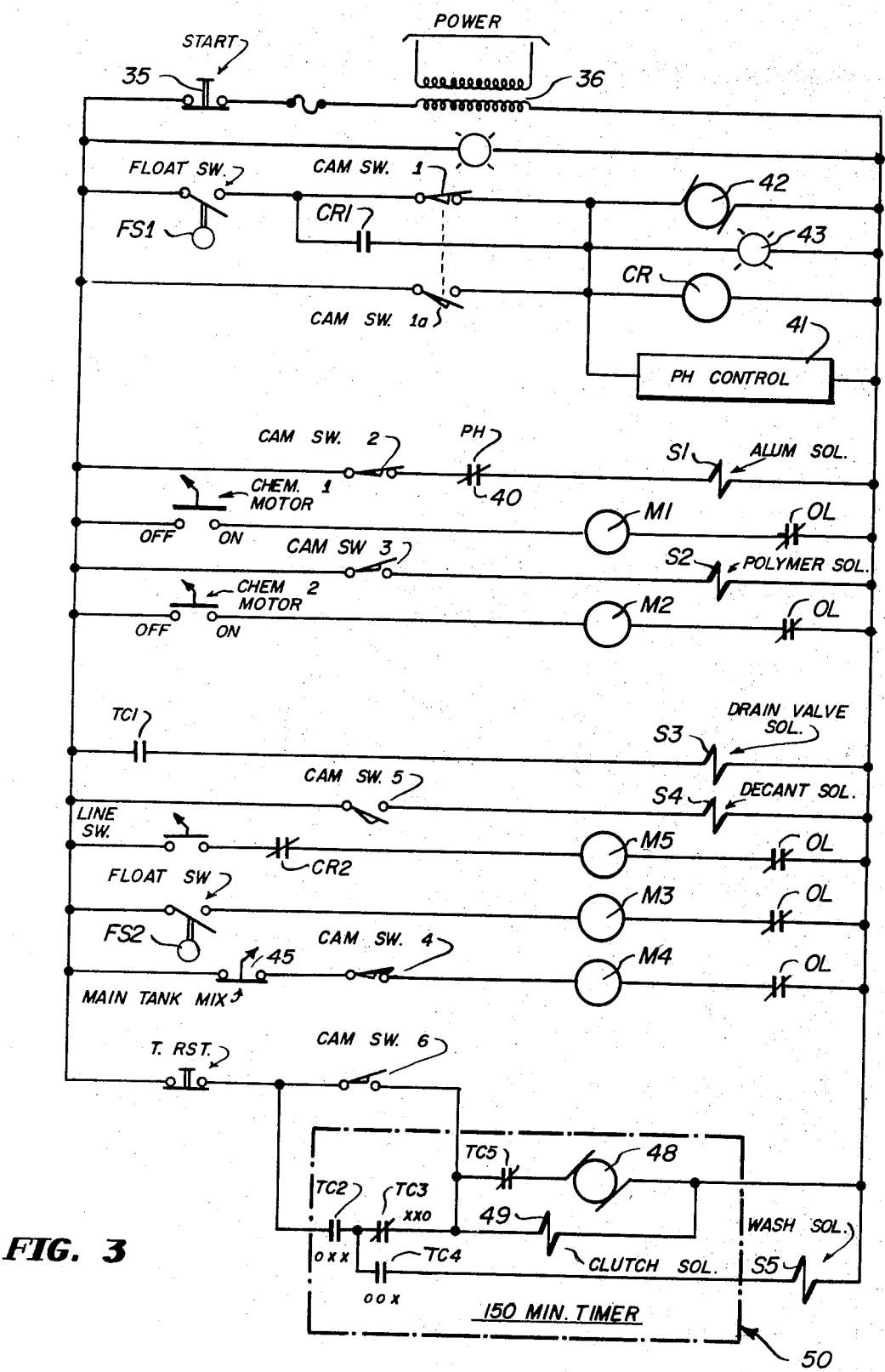
FIG. 3 is an electrical schematic of the electrical apparatus of the apparatus of FIG. 1.

The cam motor 42 operates a series of cams which open and close the cam switches 1 through 6 in the sequence and for the times indicated in the sequence chart shown in FIG. 2. Accordingly, when the cam motor 42 is energized, in FIG. 2 it can be seen that the cam 1 thereof after a very brief interval, which in the illustrated embodiment is 20 seconds, operates the cam switch 1 to open it and simultaneously closes the cam switch 1a thereby providing a holding circuit for the cam motor 42, the relay CR and the pH controller 41, bypassing the float switch FS1. Bypassing the float switch FS1, in this manner, prevents the cam motor 42 from being de-energized after the start of the cycle of operation and during the time that the clear effluent is drained from the flocculating tank 10, as described more fully below.

Cam 2 of the cam motor 42 functions to open the cam switch 2 after an interval, which in the illustrated embodiment is 5 minutes, to deenergize the solenoid S1 controlling the flow of the alum slurry into the flocculating tank 10. The dispensing of the alum slurry into the flocculating tank 10 also is controlled by the contact 40 of the pH controller 41, to establish a pre-determined pH level of the alum slurry and wash water mixture within the flocculating tank 10. By establishing a longer-than-necessary time period for the operation of the cam switch 2, the contcat 40 of the pH controller 41 effectively controls the dispensing of the alum slurry into the flocculating tank 10. Accordingly, the pre-established pH level is reached before the cam switch 2 is opened. The pH level which is established within the flocculating tank 10 is controlled by the pH controller 41, and the pH level normally is established within a range of 9 to 5.5. This range is established by the particular flocculating chemicals used, to produce the greatest degree of flocculation of the ink waste and other objectionable materials in the wash water.

The motor M4 for the mixer 21 within the flocculating tank 10 also preferably is energized at the start of the cycle of operation, by closing the line switch 45. Once energized, the motor M4 remains energized until after all of the flocculating chemicals have been dispensed into the flocculating tank 10, and its de-energization is controlled by the cam switch 4 operated by cam 4 of the cam motor 42, as described more fully below.

If the solenoid S1 is not de-energized by the opening of the contact 40 of the pH controller 41, after 5 minutes the cam 2 of the cam motor 42 opens the cam switch 2 to de-energize it. Approximately 15 seconds later, cam 3 of the cam motor 42 closes the normally opened cam switch 3 to energize the solenoid S2 which controls the flow of the polymer in the chemical tank 16 through the drain 20 into the flocculating tank 10. The dispensing of the polymer into the flocculating tank 10 is a batch feed and is proportioned in accordance with the volume of wash water in the flocculating tank 10 which will react with the alum slurry to cause the ink waste and other objectionable material within the wash water to flocculate. After approximately 15 seconds the cam 3 operates to again open cam switch 3 to de-energize the solenoid S2, thus cutting off the flow of polymer into the flocculating tank 10, and the cam 4 of the cam motor 42 operates to open cam switch 4 to de-energize motor M4 operating the mixer 21 in the flocculating tank 10. At this time a settling period of approximately 20 minutes is established, to permit the flocculated ink waste and other objectionable materials in the wash water to settle to the bottom of the flocculating tank 10. At this time, after the settling period, cam 5 of the cam motor 42 operates and closes cam switch 5 to energize solenoid S4, to decant the clear effluent in the flocculating tank 10 out of it through the drain 26. The solenoid S4 remains energized for a sufficient period of time to permit the clear effluent to drain to an estabilshed level within the flocculating tank 10. In an operative embodiment, the flocculating tank 10 is filled with approximately 260 gallons of wash water and approximately 6 minutes is required to drain the clear effluent from the tank.

At the time that cam 5 of the cam motor 42 operates to open its cam switch 5, the cam 6 of the cam motor 42 operates to close the cam switch 6 to enegize a motor 48 and a clutch solenoid 49 of a 150 minute timer 50. The timer 50 includes contacts TC1–TC5 which are operated in a reset, timing and timed out circuit conditions as indicated by the symbols O and X beneath them, Accordingly, as indicated, during the reset condition, the contacts TC1, TC2 and TC4 are opened, while the contacts TC3 and TC5 are closed. Upon energization of the motor 48 and the clutch solenoid 49 of the timer 50, the timer cycles to its timing cycle, thus closing its contacts TC1 and TC2. Its contacts TC3 and TC5 remain closed, while its contact TC4 remains opened. At its contact TC1, the solenoid S3 is energized to thereby permit the sludge which is settled within the flocculating tank 10 to drain through the drain 11 onto the receiving tray 30. At its contact TC2, a holding circuit is closed about the cam switch 6 for the motor 48 and the clutch solenoid 49 of the timer 50. The timing cycle of the timer 50 can be established from 0 to 150 minutes, depending upon the length of time required for the sludge to drain from the flocculating tank onto the receiving tray 30 and from there onto the filter paper 29. As the sludge drains onto the receiving tray 30, it spreads out and spills onto the filter paper 29 where it is de-watered, with the dewatered sludge collecting on the filter paper 29. The filtrate drains through the filter paper 29 and is collected in the tank 31, and can be drained from the latter back into the flocculating tank 10, or alternatively, back into the holding tank 12 or to the sewer, as desired. When the sludge buildup or filter cake on the filter paper 29 reaches a pre-determined thickness of approximately 3 inches, the float switch FS2 is operated to energize the motor M3. The motor M3 operates the conveyor belt 28 to advance the filter paper 29, until the sludge level drops sufficiently to turn the motor M3 off again. As the filter paper 29 is continually advanced by the conveyor belt 28, it is dispensed within disposal means such as the tote bin 52. Once collected in the tote bin 52, the filter paper with the sludge on it can be disposed in any suitable fashion.

When the timer 50 times out, its contact TC4 which is an early closing contact closes to energize the solenoid S5 to permit water to flow through the shower heads 24 and 25 to wash the side walls of the flocculating tank and the probe 22 of the pH controller 41. Thereafter, contact TC3 and TC5 of the timer 50 open to de-energize the motor 48 and the clutch solenoid 49. When the clutch solenoid 49 restores, all of the contacts TC1–TC5 of the timer 50 restore to their condition during reset.

What is claimed is:

1. A method of treating water to remove therefrom objectionable materials capable of being flocculated, said method being carried out automatically in a timed sequence and consisting essentially of the following steps in the following sequence:
    (a) selecting a first flocculating chemical capable of flocculating said objectionable material and being adapted to be precipitated at a predetermined pH level by a second flocculating chemical;
    (b) filling a flocculating-settling tank with a measured predetermined volume of the water to be treated;
    (c) introducing continuously said second flocculating chemical into said tank as said tank is being filled to establish said predetermined pH level of the water in said tank, the pH level of the water in said flocculating-settling tank being continuously tested and the introduction of said second flocculating chemical being stopped when the water reaches said predetermined pH level:
    (d) mixing the water and said second flocculating chemical as they are being introduced into said tank;
    (e) introducing into said tank in a batch quantity said first flocculating chemical in an amount proportionate to the amount of said second flocculating chemical thereby reacting said first flocculating chemical with said second flocculating chemical and causing said objectionable material to flocculate;
    (f) permitting the flocculated material to settle within said tank for a fixed period of time after the pH of the water has reached said predetermined pH level and said first flocculating chemical has been introduced into said tank;
    (g) draining the clear water from said tank;
    (h) draining the flocculated material onto a filter to dewater it; and
    (i) disposing of the dewatered flocculated material on said filter.

2. The method of claim 1, wherein the flow of water into said flocculating-settling tank is cut off when the volume of water reaches said measured pre-determined volume, whereby the same volume of water is placed in said flocculating-settling tank during each cycle of operation.

3. The method of claim 2, wherein said flocculated material is drained onto a roll-fed web of filter paper to dewater it, said web of filter paper being automatically advanced when the build-up of material on said filter paper reaches a predetermined thickness.

4. The method of claim 1, further including the steps of collecting said wash water in a holding tank, and filling said flocculating-settling tank from said holding tank with a predetermined volume of said wash water, the flow of wash water into said flocculating-settling tank being automatically shut off when said predetermined volume is reached, whereby the same volume of wash water is placed in said flocculating-settling tank during each cycle of operation.

5. The method of claim 1, wherein said flocculating chemicals comprise alum and a polyelectrolyte.

6. The method of claim 5, wherein said polyelectrolyte comprise sulfuric acid.

7. The method of claim 5, wherein said polyelectrolyte comprises ferric chloride.

References Cited

UNITED STATES PATENTS

| | | | |
|---|---|---|---|
| 3,474,033 | 10/1969 | Stout et al. | 210—52 X |
| 2,243,826 | 5/1941 | Nielsen et al. | 210—42 |
| 3,247,106 | 4/1966 | Sopoci | 210—52 |
| 3,478,879 | 11/1969 | Hirs | 210—387 X |
| 3,652,383 | 3/1972 | De Vos | 162—4 |
| 3,544,476 | 12/1970 | Aiba et al. | 210—42 X |
| 2,877,177 | 3/1959 | Story | 210—49 |
| 3,171,800 | 3/1965 | Rice et al. | 210—52 |
| 3,393,149 | 7/1968 | Conley et al. | 210—42 |
| 3,358,834 | 12/1967 | El-Hindi | 210—387 X |

OTHER REFERENCES

Chemical Treatment of Sewage & Industrial Wastes, National Lime Assoc., Bulletin No. 215, 1965, pp. 1–20, 23–32.

SAMIH N. ZAHARNA, Primary Examiner

R. H. SPITZER, Assistant Examiner

U.S. Cl. X.R.

210—51, 53